(12) United States Patent
Hasegawa

(10) Patent No.: US 12,313,050 B2
(45) Date of Patent: May 27, 2025

(54) COMPRESSOR

(71) Applicant: FUJITSU GENERAL LIMITED, Kanagawa (JP)

(72) Inventor: Tomooki Hasegawa, Kanagawa (JP)

(73) Assignee: FUJITSU GENERAL LIMITED, Kanagawa (JP)

( * ) Notice: Subject to any disclaimer, the term of this patent is extended or adjusted under 35 U.S.C. 154(b) by 306 days.

(21) Appl. No.: 17/634,153

(22) PCT Filed: Jun. 12, 2020

(86) PCT No.: PCT/JP2020/023130
§ 371 (c)(1),
(2) Date: Feb. 9, 2022

(87) PCT Pub. No.: WO2021/059616
PCT Pub. Date: Apr. 1, 2021

(65) Prior Publication Data
US 2022/0294280 A1    Sep. 15, 2022

(30) Foreign Application Priority Data

Sep. 26, 2019    (JP) ................................. 2019-176160

(51) Int. Cl.
| | |
|---|---|
| *F04B 35/04* | (2006.01) |
| *F25B 31/02* | (2006.01) |
| *H02K 21/16* | (2006.01) |

(52) U.S. Cl.
CPC ............ *F04B 35/04* (2013.01); *H02K 21/16* (2013.01); *F04C 2230/231* (2013.01); *F25B 31/026* (2013.01)

(58) Field of Classification Search
CPC ...... H02K 1/146; H02K 15/028; H02K 21/16; H02K 2201/09; F04B 17/03; F04B 35/04;
(Continued)

(56) References Cited

U.S. PATENT DOCUMENTS

| | | | |
|---|---|---|---|
| 2002/0163277 A1 | 11/2002 | Miyake et al. | |
| 2006/0108891 A1* | 5/2006 | Fujita | ................... H02K 15/022 310/216.011 |

(Continued)

FOREIGN PATENT DOCUMENTS

| | | |
|---|---|---|
| CN | 201810512 U | 4/2011 |
| CN | 110024268 A | 7/2019 |

(Continued)

OTHER PUBLICATIONS

Dec. 15, 2023, Chinese Office Action issued for related CN Application No. 202080057501.7.

*Primary Examiner* — Alexander B Comley
(74) *Attorney, Agent, or Firm* — Paratus Law Group, PLLC

(57) ABSTRACT

A stator includes a stator core which is annular and in which a plurality of metal plates are layered. The stator core includes a plurality of swaging portions, in which the metal plates are joined by swaging. A heat insulation space that blocks heat, which is transmitted from a welding portion, is formed in a swaging portion that is arranged in a position corresponding to the welding portion in a circumferential direction of the stator core among the swaging portions.

3 Claims, 8 Drawing Sheets

(58) Field of Classification Search
CPC .............. F04B 53/22; F04B 2230/231; F04C 2/344–3568; F04C 2230/231
See application file for complete search history.

(56) References Cited

U.S. PATENT DOCUMENTS

| | | | |
|---|---|---|---|
| 2017/0276135 A1* | 9/2017 | Komai | ................ F04C 18/356 |
| 2019/0249653 A1 | 8/2019 | Suzuki | |
| 2019/0356183 A1 | 11/2019 | Kinjo et al. | |
| 2020/0044522 A1 | 2/2020 | Hasegawa et al. | |

FOREIGN PATENT DOCUMENTS

| | | | | |
|---|---|---|---|---|
| CN | 110100373 A | | 8/2019 | |
| JP | H06-233501 A | | 8/1994 | |
| JP | H06-245439 A | | 9/1994 | |
| JP | 2000-324728 A | | 11/2000 | |
| JP | 2003219585 A | * | 7/2003 | |
| JP | 2004328865 A | * | 11/2004 | ............ H02K 15/022 |
| JP | 2007330092 A | * | 12/2007 | |
| JP | 2009261162 A | * | 11/2009 | |
| JP | 2011055576 A | * | 3/2011 | |
| JP | 4858564 B2 | | 1/2012 | |
| JP | 2013031311 A | * | 2/2013 | |
| JP | 2013-100831 A | | 5/2013 | |
| JP | 2018091157 A | * | 6/2018 | .............. F04B 17/03 |
| WO | WO-2010113664 A1 | * | 10/2010 | .............. F04B 39/06 |

\* cited by examiner (C-C)

(D-D)

(D-D)

(D-D)

(D-D)

COMPRESSOR

CROSS REFERENCE TO PRIOR APPLICATION

This application is a National Stage Patent Application of PCT International Patent Application No. PCT/JP2020/023130 (filed on Jun. 12, 2020) under 35 U.S.C. § 371, which claims priority to Japanese Patent Application No. 2019-176160 (filed on Sep. 26, 2019), which are all hereby incorporated by reference in their entirety.

FIELD

The present invention relates to a compressor.

BACKGROUND

A rotary compressor, in which an outer circumferential surface of a stator of a motor is welded with a compressor housing, is known as a sealed rotary compressors, in which a compressor and a motor are arranged in a compressor housing. A stator core forming a stator of a rotary compressor of this type is formed by combining a plurality of metal plates in a state of being layered. In a state of being kept combined, the metal plates forming the stator core are welded with a compressor housing, so that the stator is joined to the compressor housing.

There is, as a rotary compressor of the relevant technology, a rotary compressor in which a gap (a heat insulation space below) for blocking heat, transmitted from a welding portion to a stator core at welding, is formed through a cylindrical yoke in the stator core in a direction in which metal plates are layered.

CITATION LIST

Patent Literature

Patent Literature 1: Japanese Patent No. 4858564

SUMMARY

Technical Problem

As described, however, because the penetrating gap in the direction, in which the metal plates are layered, is formed in the stator core, and accordingly the stator core is in a state where the metal plates overlap only and are not joined around the gap, rigidity around the gap in the stator core lowers. Accordingly, there is a risk that a decrease in mechanical strength of the stator core would be caused.

The technique disclosed herein was made in view of the above-described circumstances, and an object of the technique is to provide a compressor that makes it possible to suppress transmission of heat from a welding portion to a stator core at welding, and increase mechanical strength of the stator core.

Solution to Problem

According to an aspect of an embodiments in the present application, a compressor includes a compressor housing, in which an intake unit and an ejection unit for a refrigerant are arranged; a compress on unit that is arranged in the compressor housing, and that is configured to compress the refrigerant, which is taken in from the intake unit; and a motor that is arranged in the compressor housing, and that is configured to drive the compression unit, the motor including a rotor that is arranged coaxially with a rotation shaft of the compression unit, and a stator that is arranged on an outer circumferential side of the rotor, and the stator having an outer circumferential surface on which a plurality of welding portions, in which the stator and the compressor housing are welded together, are formed, wherein the stator includes a stator core which is annular and in which a plurality of metal plates are layered, the stator core includes a plurality of swaging portions, in which the metal plates are joined by swaging, and a heat insulation space that blocks heat, which is transmitted from the welding portion, is formed in the swaging portion that is arranged in a position corresponding to the welding portion in a circumferential direction of the stator core among the swaging portions.

Advantageous Effects of Invention

According to an aspect of an embodiment of the compressor disclosed in the present application, it is possible to suppress heat from being transmitted from a welding portion to a stator core at welding and increase mechanical strength of the stator core.

DESCRIPTION OF EMBODIMENTS

An embodiment of a compressor disclosed herein will be described in detail below based on the drawings. The embodiment below does not limit the compressor disclosed herein.

First Embodiment

Figure 1:
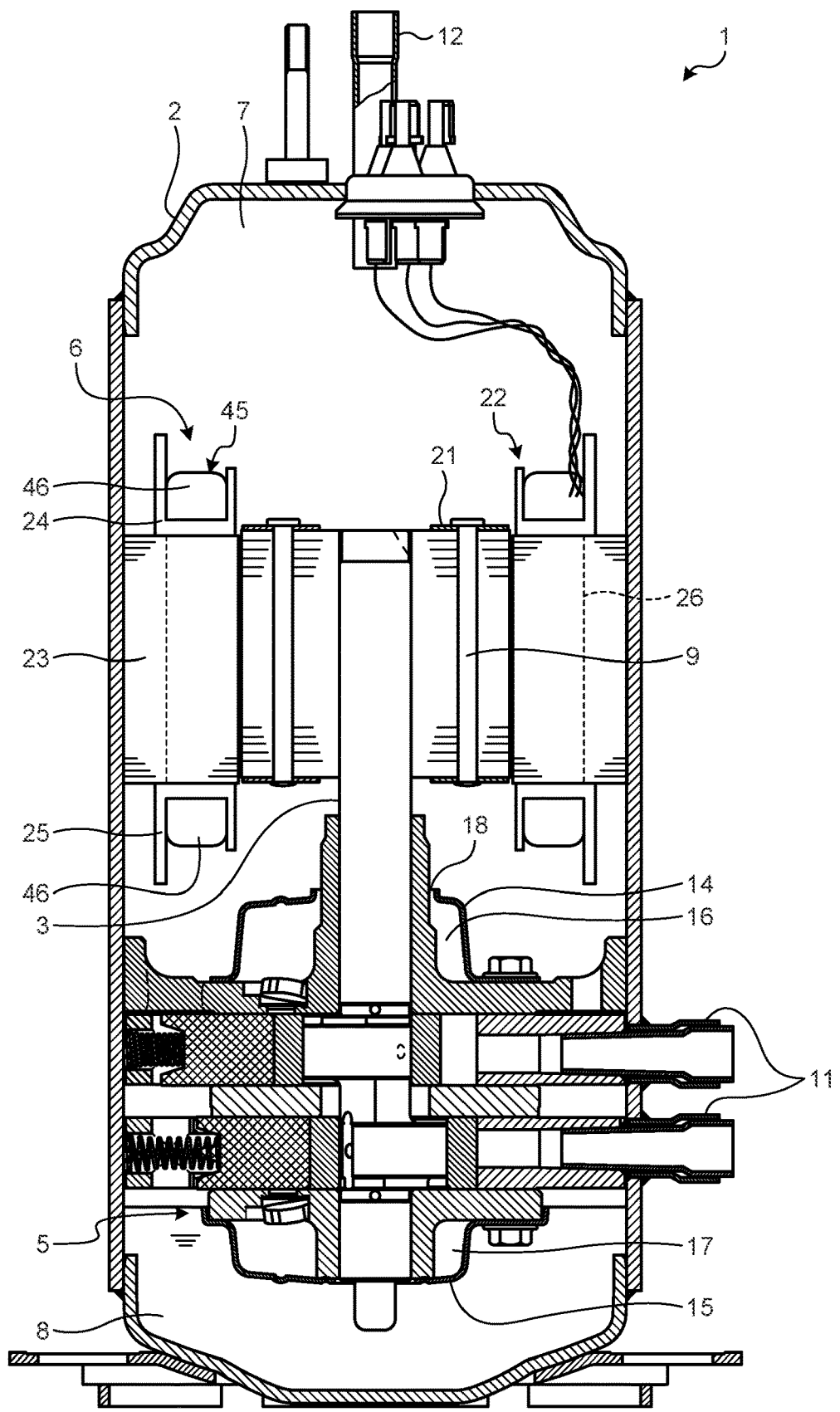
FIG. 1 is a longitudinal cross-sectional view illustrating a compressor according to a first embodiment.

FIG. 1 is a longitudinal cross-sectional view illustrating a compressor of a first embodiment. As illustrated in FIG. 1, a compressor 1 is what is called a rotary compressor, and includes a container 2 serving as a compressor housing, a shaft 3 serving as a rotation shaft, a compression unit 5, and a three-phase motor 6. The container 2 is formed of a metal material, and forms a sealed internal space 7. The internal space 7 is formed approximately cylindrically. The container 2 is formed such that, when the container 2 is placed longitudinally, the center axis of a cylinder forming the internal space 7, is parallel to the vertical direction. An oil reservoir 8 is formed in a lower part of the internal space 7. Refrigerant oil serving as a lubricant that lubricates the compression unit 5, is stored in the oil reservoir 8. To the container 2, an intake pipe 11 for taking a refrigerant in, and an ejection pipe 12 that ejects a compressed refrigerant, are connected. The shaft 3 serving as a rotation shaft is formed into a shape of a rod, and is arranged in the internal space 7 of the container 2 such that one end of the shaft 3 is arranged in the oil reservoir 8. The shaft 3 is supported on the container 2 rotatably about a center axis of the cylinder forming the internal space 7. The shaft 3 rotates and thus supplies the refrigerant oil, which is stored in the oil reservoir 8, to the compression unit 5.

The compression unit 5 is arranged in a lower part in the internal space 7, and is arranged above the oil reservoir 8. The compressor 1 further includes an upper muffler cover 14 and a lower muffler cover 15. The upper muffler cover 14 is arranged above the compression unit 5 in the internal space 7. The upper muffler cover 14 forms an upper muffler chamber 16 inside. The lower muffler cover 15 is arranged under the compression unit 5 in the internal space 7, and is arranged above the oil reservoir 8. The lower muffler cover 15 forms a lower muffler chamber 17 inside. The lower muffler chamber 17 communicates with the upper muffler chamber 16 via a communication path (not illustrated in the drawing) that is formed in the compression unit 5. A compressor refrigerant ejection hole 18 is formed between the upper muffler cover 14 and the shaft 3, and the upper muffler chamber 16 communicates with the internal space 7 via the compressor refrigerant ejection hole 18.

The shaft 3 rotates and thus the compression unit 5 compresses the refrigerant, which is supplied from the intake pipe 11, and supplies the compressed refrigerant to the upper muffler chamber 16 and the lower muffler chamber 17. The refrigerant has compatibility with the refrigerant oil. The three-phase motor 6 is arranged above the compression unit 5 in the internal space 7.

Figure 2:
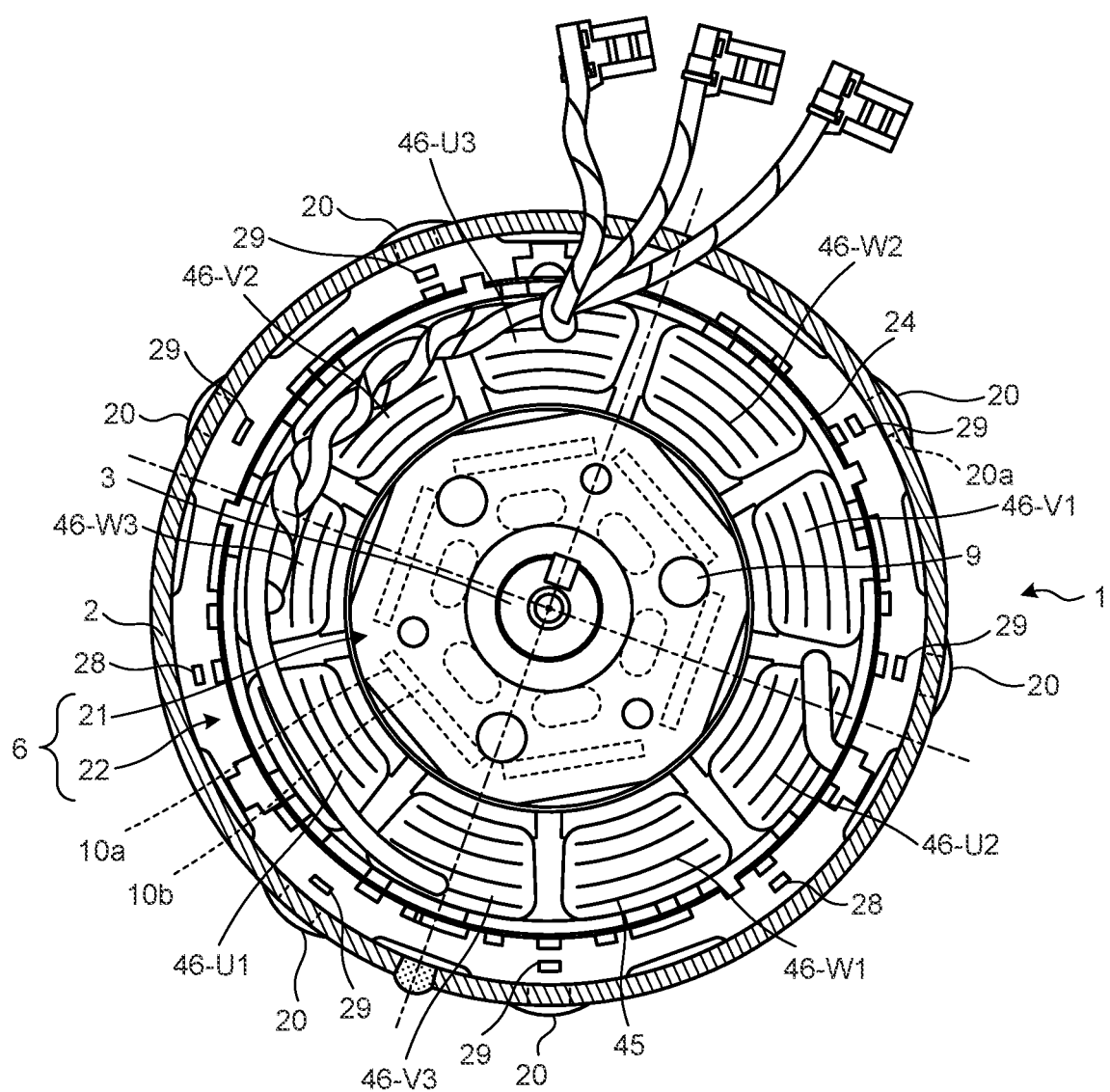
FIG. 2 is a transverse cross-sectional view illustrating a three-phase motor of the compressor of the first embodiment.

FIG. 2 is a transverse cross-sectional view illustrating the three-phase motor 6 of the compressor 1 of the first embodiment. As illustrated in FIGS. 1 and 2, the three-phase motor 6 includes a rotor 21 and a stator 22. A plurality of metal plates are layered and the rotor 21 is formed cylindrically, and the metal plates are combined by swaging portions and a plurality of rivets 9. The shaft 3 is inserted into the center of the rotor 21 and is fixed. In the rotor 21, six slit-like magnet embedding holes 10a are formed such that the magnet embedding holes 10a form the sides of a hexagon about the shaft 3, respectively. The magnet embedding holes 10a are formed at given intervals in a circumferential direction of the rotor 21. Platy permanent magnets 10b are embedded in the magnet embedding holes 10a.

The stator 22 is formed approximately cylindrically and is arranged such that the stator 22 surrounds an outer circumferential side of the rotor 21. The stator 22 includes an annular stator core 23, an upper insulator 24, a lower insulator 25, and a plurality of winding wires 46 (refer to FIG. 1). The stator 22 and the container 2 are welded at a plurality of welding portions 20 that are formed in the circumferential direction of the stator 22. In other words, an outer circumferential surface of the stator core 23 is welded with an inner circumferential surface of the container 2 at the welding portions 20. In the first embodiment, through-holes 20a penetrating in a radial direction of the container 2 are formed in spots corresponding to the welding portions 20 in a circumferential direction of the container 2. The stator core 23 is welded with the container 2 at the welding portions 20 by spot welding via the through-holes 20a of the container 2. The welding portions 20 are formed at intervals in the circumferential direction of the stator 22 (around the axis of the shaft 3). The welding portions 20 are formed in an axial direction of the stator 22 (an axial direction of the shaft 3).

Figure 6:
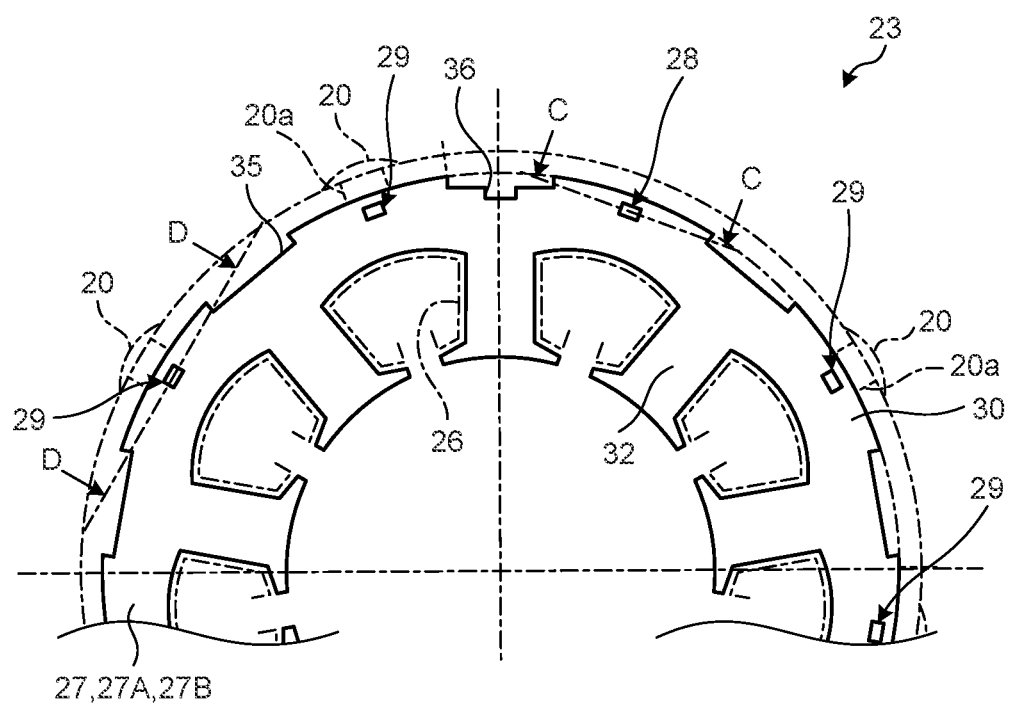
FIG. 6 is a plane view for explaining a principal part of the stator core in the first embodiment.

The upper insulator 24 is fixed to an upper end of the stator core 23. The lower insulator 25 is fixed to a lower end of the stator core 23. As illustrated in FIGS. 1, 2 and 6, in the stator core 23, an insulating film 26 is inserted along inner circumferential surfaces of slots between stator core teeth 32-1 to 32-9 to be described below, and the insulating film 26 insulates the stator core 23 and the winding wires 46 from each other. The insulating film 26 is, for example, formed of a resin material, such as polyethylene terephthalate (PET) or polyethylene naphthalate (PEN). The upper insulator 24 and the lower insulator 25 are formed of a resin material, and serve as an insulating member that insulates the stator core 23 and the winding wires 46 from each other.

Figure 3:
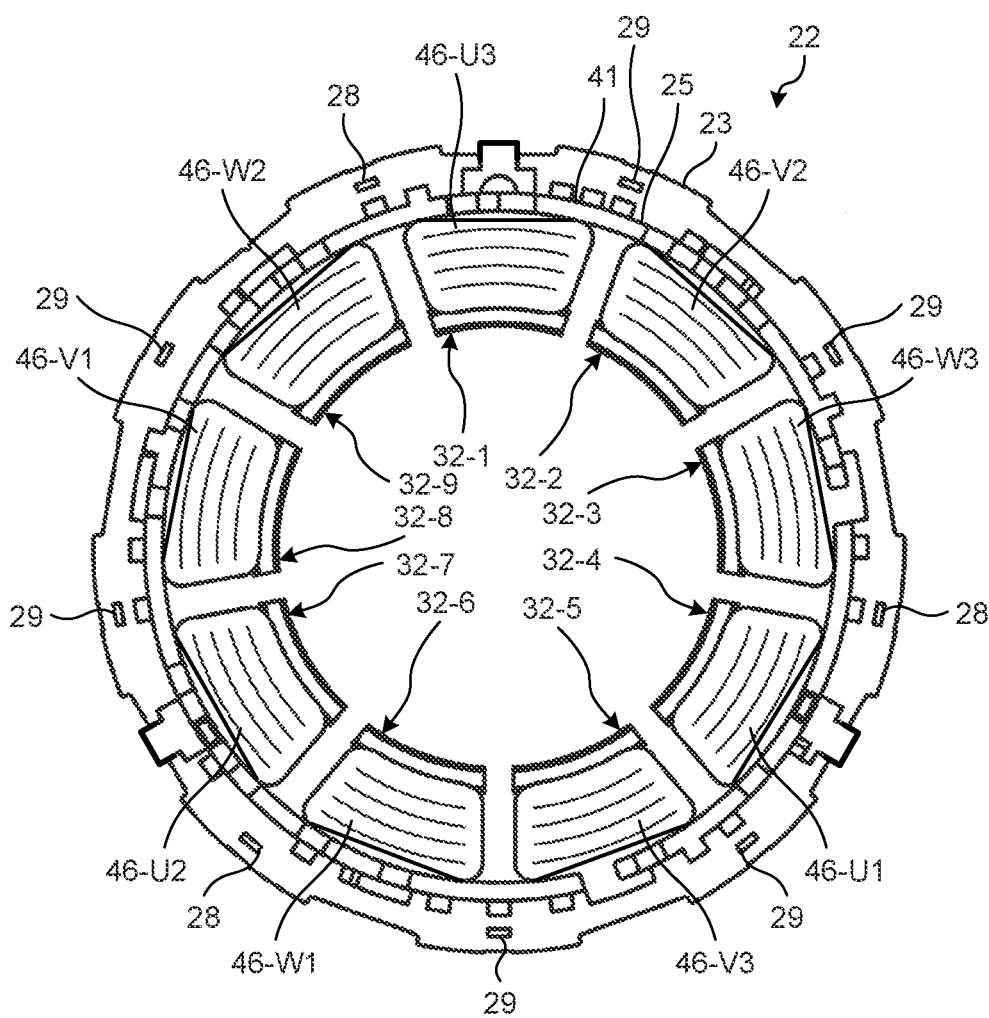
FIG. 3 is a plane view illustrating a stator of the three-phase motor in the first embodiment.

FIG. 3 is a plane view illustrating the stator 22 of the three-phase motor 6 in the first embodiment. As illustrated in FIG. 3, the winding wires 46, which are electric wires, are wound around the stator core teeth 32-1 to 32-9 to be described below, respectively. In the stator core teeth 32-1 to 32-9, winding portions 45 are formed by the winding wires 46, respectively. The three-phase motor 6 in the embodiment is a 6 pole 9 slot concentrated winding motor (refer to FIG. 2). The winding wires 46 include a plurality of U-phase winding wires 46-U1 to 46-U3, a plurality of V-phase winding wires 46-V1 to 46-V3, and a plurality of W-phase winding wires 46-W1 to 46-W3. In the stator 22, neutral lines, which are drawn from the respective winding portions 45 and are bundled, are covered with an insulating tube, and are inserted into a gap between the winding portions 45 adjacent to each other in the circumferential direction of the stator 22 (the direction of rotation of the rotor 21) (refer to FIG. 2).

Figure 4:
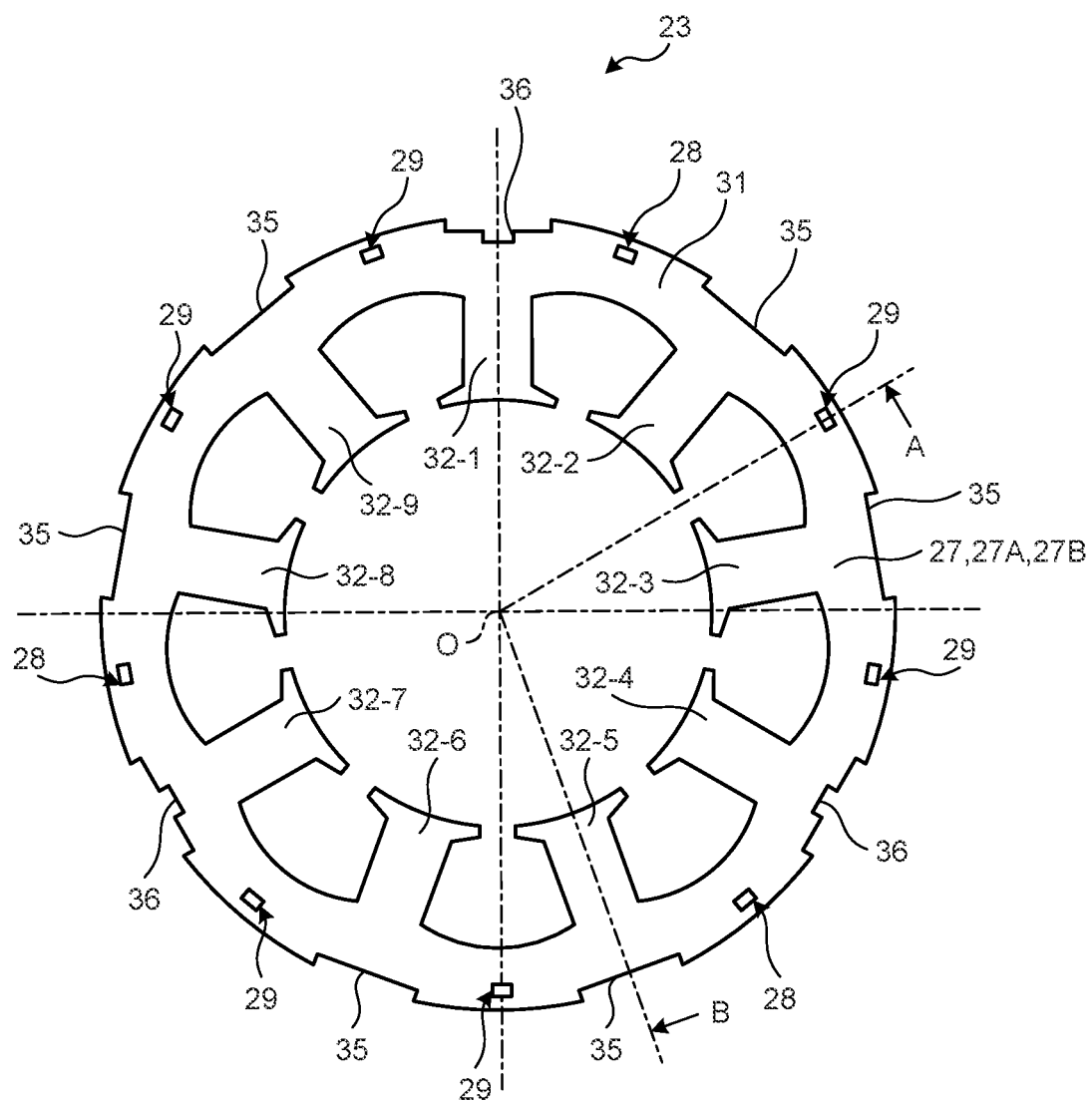
FIG. 4 is a plane view illustrating a stator core in the first embodiment.
Figure 5:
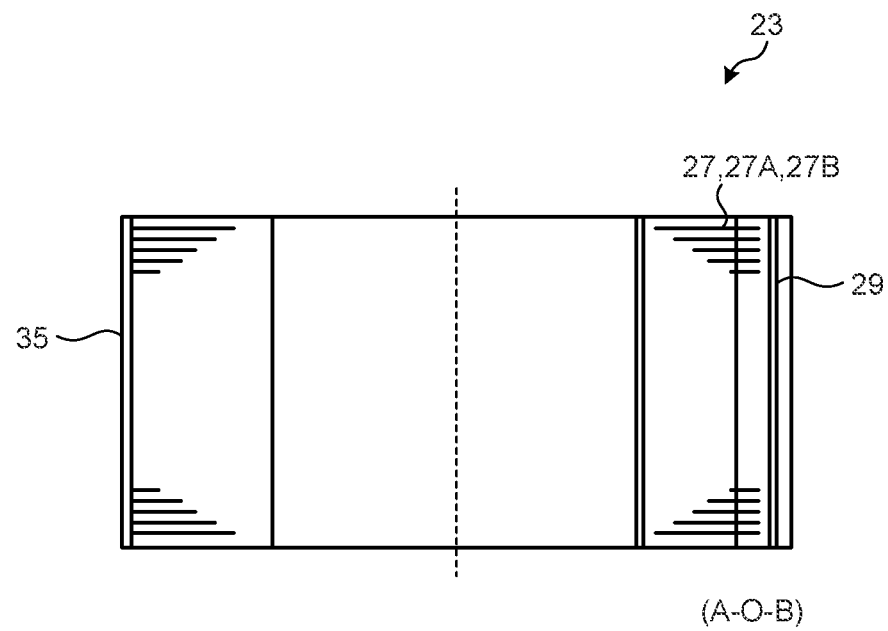
FIG. 5 is a longitudinal cross-sectional view illustrating the stator core in the first embodiment.

FIG. 4 is a plane view illustrating the stator core 23 in the first embodiment. FIG. 5 is a longitudinal cross-sectional view illustrating the stator core 23 in the first embodiment FIG. 5 is an A-O-B cross-sectional view passing through a center O of the stator core 23 in FIG. 4. As illustrated in FIG. 4, the stator core 23 includes a yoke 31, and the stator core teeth 32-1 to 32-9 serving as a winding drum portion and, as illustrated in FIG. 5, is formed by layering the metal plates 27. The metal plates 27 are formed of soft magnetic material, such as a silicon steel sheet.

The yoke 31 is formed approximately cylindrically. A first stator core tooth 32-1 among the stator core teeth 32-1 to 32-9 is formed approximately prismatically. One end of the first stator core tooth 32-1 is formed continuously on an inner circumference side of the yoke 31, that is, is formed such that the one end protrudes from the inner circumferential surface of the yoke 31 toward a center axis of the stator core 23. Stator core teeth 32-2 to 32-9 other than the first stator core tooth 32-1 out of the stator core teeth 32-1 to 32-9, are also formed approximately prismatically as the stator core tooth 32-1 is, and protrude from the inner circumferential surface of the yoke 31 toward the center axis of the stator core 23. The stator core teeth 32-1 to 32-9 are formed such that the stator core teeth 32-1 to 32-9 are arranged at equal intervals of 40 degrees in a circumferential direction of the yoke 31 on the inner circumferential surface of the yoke 31. The stator core teeth 32-1 to 32-9 of the stator core 23 are referred to as stator core teeth 32 below.

In positions corresponding to the stator core teeth 32 in a circumferential direction of the outer circumferential surface or the stator core 23, a plurality of concave portions 35 through which the refrigerant pass, and a plurality of cutouts 36 for positioning to fix the upper insulator 24 and the lower insulator 25 to the stator core 23, are formed along an axial direction of the stator core 23. On the outer circumferential surface of the stator core 23 in the first embodiment, six concave portions 35 and three cutouts 36, are formed.

Characteristic Configuration of Compressor

A characteristic configuration of the compressor 1 of the first embodiment will be described next. The characteristics of the first embodiment include the stator core 23. The metal plates 27, forming the stator core 23, includes first metal plates 27A and second metal plates 27B. The stator core 23 is formed by layering the first metal plates 27A and the second metal plates 27B in a given order. When the metal plates 27 are referred to below, the metal plates 27 inclusively refer to the first metal plates 27A and the second metal plates 27B.

FIG. 6 is a plane view for explaining a principal part of the stator core 23 in the first embodiment. As illustrated in FIGS. 4 and 6, the stator core 23 includes a plurality of swaging portions (a plurality of first swaging portions 28 and a plurality of second swaging portions 29), in which the layered metal plates 27 are joined by swaging. In the stator core 23 of the first embodiment, three first swaging portions 28 and six second swaging portions 29, that is, nine swaging portions in total are arranged at equal intervals in the circumferential direction of the yoke 31. In other words, in a circumferential direction of the stator core 23, the swaging portions are arranged clockwise regularly in the following order: the first swaging portion 28, the second swaging portion 29, the second swaging portion 29, the first swaging portion 28, the second swaging portion 29, the second swaging portion 29, the first swaging portion 28, the second swaging portion 29, and the second swaging portion 29. In other words, two second swaging portions 29 are arranged at equal intervals between the first swaging portions 28 that are arranged in the circumferential direction. Note that the second swaging portions 29 are swaging portions that are formed in positions corresponding to the welding portions 20 in the circumferential direction of the stator core 23 (in other words, positions on the outer circumference of the stator core 23 and on the inner side with respect to the welding portions 20 in the radial direction of the stator 22). On the other hand, the first swaging portions 28 are swaging portions that are formed in positions not corresponding to the welding portions 20 in the circumferential direction of the stator core 23 (in other words, in positions on the outer circumference of the stator core 23 and not on the inner side with respect to the welding portions 20 in the radial direction of the stator 22).

Figure 7:
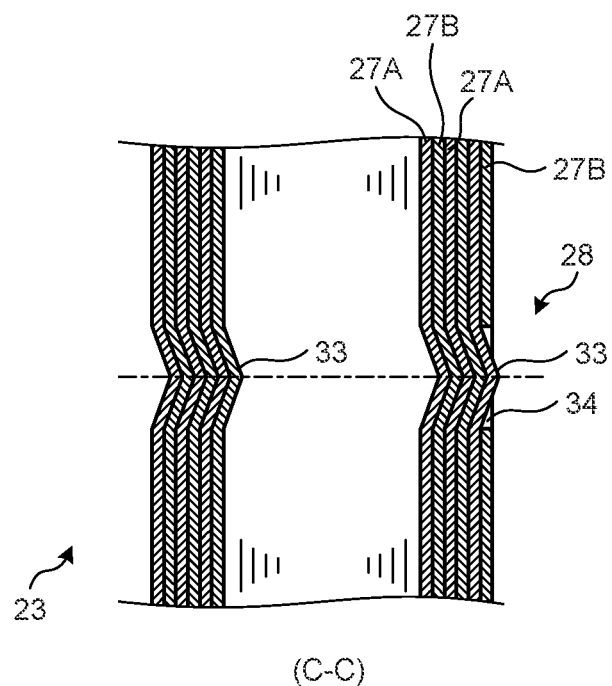
FIG. 7 is a longitudinal cross-sectional view illustrating a first swaging portion of the stator core in the first embodiment in an enlarged manner.
Figure 8:
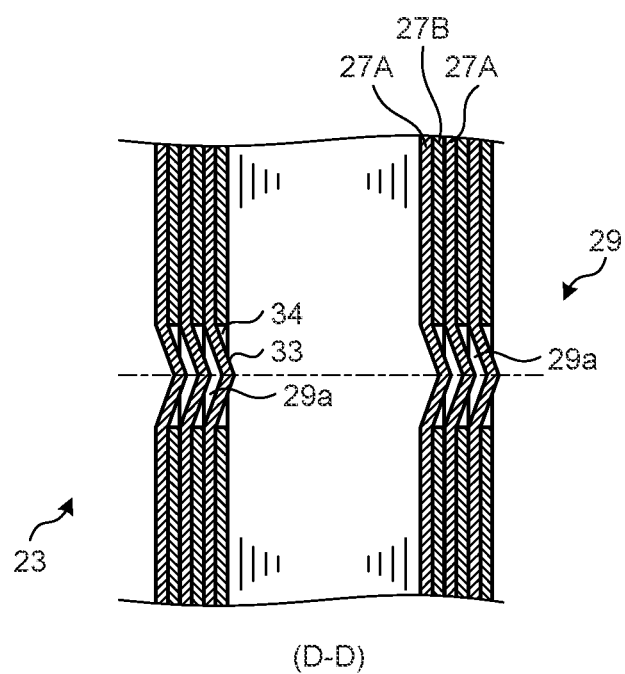
FIG. 8 is a longitudinal cross-sectional view illustrating a second swaging portion and a heat insulation space of the stator core in the first embodiment in an enlarged manner.

FIG. 7 is a longitudinal cross-sectional view illustrating the first swaging portion 28 of the stator core 23 in the first embodiment in an enlarged manner, and is a cross-sectional view taken along the line C-C in FIG. 6. FIG. 8 is a longitudinal cross-sectional view illustrating the second swaging portion 29 of the stator core 23 in the first embodiment in an enlarged manner, and is a cross-sectional view taken along the line D-D in FIG. 6.

In the first embodiment, the stator core 23 is formed by layering the first metal plates 27A and the second metal plates 27B alternately. Protrusions 33 are formed in the first metal plates 27A and the second metal plates 27B because the first metal plates 27A and the second metal plates 27B are joined by swaging in the swaging portions (the first swaging portions 28 and the second swaging portions 29). The metal plates 27 are swaged such that part of the metal plates 27 protrude in a thickness direction of the metal plates 27, so that the protrusions 33 are formed into a state of being bent in a V-shape in its cross section. As described above, in the stator core 23, because the metal plates 27 are joined by swaging in the first swaging portions 28, it is possible appropriately ensure mechanical strength of the stator core 23 in which the metal plates 27 are joined together. The shape of the protrusion 33 is not limited to the V-shape in the cross section that is formed by V swaging, and the shape may be changed as appropriate. For example, the shape of the protrusion 33 may be convex shape in the cross section that is formed by dowel swaging.

As illustrated in FIG. 6, the first swaging portions 28 are arranged in positions excluding positions corresponding to the welding portions 20 in the circumferential direction of the stator core 23, that is, positions not corresponding to the welding portions 20. The metal plates 27 that are the first metal plates 27A and the second metal plates 27B layered in the given order are swaged in the first swaging portions 28, so that the protrusions 33 with the V-shape in the cross sections that are adjacent in the direction, in which the metal plates 27 are layered, are joined.

In the first swaging portion 28, a through-hole 34, into which the protrusion 33 enters, is formed in the metal plate 27 (the second metal plate 27B) that is arranged at one end in the direction in which the metal plates 27 are layered, which prevents the protrusion 33 from protruding from the end face of the stator core 23. In the first embodiment, the second metal plate 27B that is arranged at the one end in the direction, in which the metal plates 27 are layered, is different in shape from the second metal plate 27B, in which the protrusion 33 is formed, but is referred to as the second metal plate 27B here. The stator core 23 is arranged such that the side on which the protrusion 33 protrudes in the first swaging portion 28, that is, the one end in which the second metal plate 27B with the through-hole 34 faces down in the compressor 1, that is, is opposed to the compression unit 5. In the first swaging portion 28, the through-hole 34 is not formed in any position other than the one end in the direction in which the metal plates 27 are layered. Note that, in the first swaging portion 28 in the embodiment, all the protrusions 33 are swaged and, in the first swaging portion 28, a space may be formed between the protrusions 33 of the metal plates 27.

As illustrated in FIGS. 2 and 6, the second swaging portions 29 are arranged respectively in positions corresponding to the respective welding portions 20 in the circumferential direction of the stator core 23. In other words, in the circumferential direction of the stator core 23, the second swaging portions 29 with spaces 29a functioning as a heat insulation space of the invention, are formed in the positions corresponding to the welding portions 20 (the positions on the inner side with respect to the welding portions 20 in the radial direction of the stator 22). As illustrated in FIG. 8, in the second swaging portion 29 in the first embodiment, the first metal plates 27A with the protrusions 33 and the second metal plates 27B with the through-holes 34 are layered alternately, so that the spaces 29a are formed between the protrusions 33 in the direction in which the metal plates 27 are layered. In other words, in the second swaging portion 29, the protrusion 33 that is formed by swaging the metal plate 27 and the space 29a functioning as the heat insulation space, are formed adjacently in the direction in which the metal plates 27 are layered. Thus, in the circumferential direction of the stator core 23, in the second swaging portion 29, the spaces 29a are formed along the direction in which the metal plates 27 are layered in the second swaging portion 29 and, by alternately layering the first metal plates 27A and the second metal plates 27B, the spaces 29a are formed in the direction in which the metal plates 27 are layered. Forming the spaces 29a in the second swaging portions 29 as described above makes it possible to, even when the welding portions 20 are formed at intervals in the axial direction of the stator core 23 (the direction in which the metal plates 27 are layered), block heat, transmitted from each of the welding portions 20 to the stator core 23, by the spaces 29a functioning as the heat insulation space.

As in the first swaging portion 28, in the second swaging portion 29, the second metal plate 278 having the through-hole 34, is arranged at one end in the direction in which the metal plates 27 are layered, and the protrusion 33 of the first metal plate 27A adjacent to the second metal plate 27B enters the through-hole 34, which prevents the protrusion 33 from protruding from an end face of the stator core 23. Thus, in the stator core 23, as illustrated in FIGS. 7 and 8, the second metal plates 27B having the protrusions 33 that are arranged in the first swaging portions 28, and the through-holes 34 that the protrusions 33 enter, respectively, are arranged at the one end in the direction in which the metal plates 27 are layered (the lower end in the case of arrangement in the container 2).

As described above, because the spaces 29a are formed in the stator core 23, there is a problem in that the stator core 23 enters a state in which the metal plates only overlap, and are not joined with each other around the spaces 29a, and rigidity around the spaces 29a of the stator core 23 lowers. Thus, in the protrusion 33 of the first metal plate 27A and the through-hole 34 of the second metal plate 27B in the first embodiment, part of the protrusion 33 (the bottom of the protrusion 33) and part of the through-hole 34 (the opening edge of the through-hole 34) are joined by swaging in the second swaging portion 29. Thus, in the present invention, rigidity around the spaces 29a of the stator core 23 is reinforced, and mechanical strength of the stator 22 is ensured. In the first swaging portion 28 illustrated in FIG. 7, because there are swaging portions where the metal plates 27 bend (the outer edges and the tips of the protrusions 33), and the protrusions 33 of the metal plates 27 that are adjacent in the direction of layering are joined by swaging, the metal plates 27 are slightly loose around the first swaging portions 28, the adherence between the metal plates 27 lowers, and accordingly dimensional accuracy of the stator core 23 in the axial direction decreases. On the contrary, in the second swaging portion 29, as illustrated in FIG. 8, the protrusions 33 and the through-holes 34 are arranged alternately in the direction in which the metal plates 27 are layered, and the spaces, in which the swaging portions are housed, are formed between the first metal plates 27A. For this reason, in the second swaging portions 29 of the first embodiment, the swaging portions (the outer edges and the tips of the protrusions 33) do not make direct contact, and thus gaps tend not to occur, adherence between the metal plates 27 (the first metal plate 27A and the second metal plate 27B) adjacent in the axial direction of the stator core 23 increases and, as a result, it is possible to increase dimensional accuracy in the axial direction of the stator core 23.

Furthermore, as illustrated in FIG. 4, the concave portions 35 and the cutouts 36 that are formed in the outer circumferential surface of the stator core 23 in the circumferential direction of the stator core 23, are formed between the first swaging portion 28 and the second swaging portion 29 that are adjacent to each other, and are formed between the second swaging portions 29 that are adjacent to each other. For this reason, the stator core 23 makes contact with the inner circumferential surface of the container 2 in spots excluding the concave portions 35 and the cutouts 36.

Figure 9:
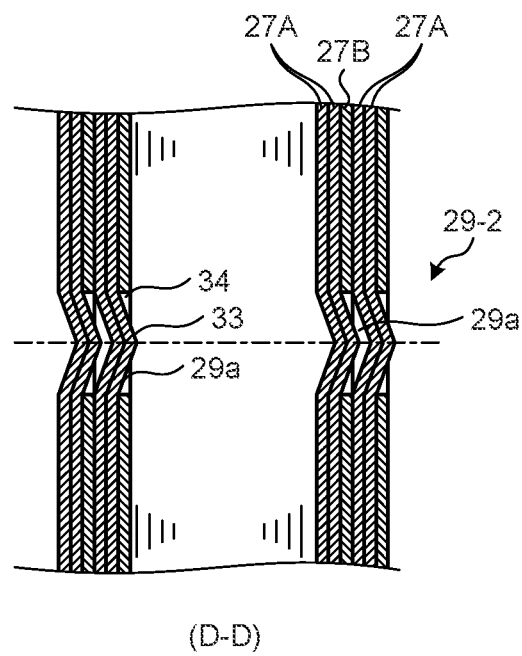
FIG. 9 is a longitudinal cross-sectional view illustrating a second swaging portion and a heat insulation space of a stator core in a second embodiment in an enlarged manner.
Figure 10:
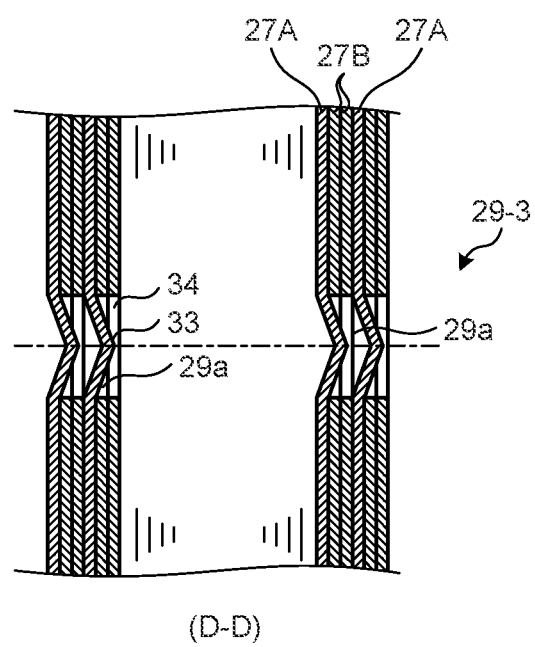
FIG. 10 is a longitudinal cross-sectional view illustrating a second swaging portion and a heat insulation space of a stator core in a third embodiment in an enlarged manner.

In the first swaging portion 28 illustrated in FIG. 7, the protrusions 33, which are formed in the respective metal plates 27 at joining by swaging, are joined successively and, as in the second swaging portion 29 illustrated in FIG. 8 or second swaging portions 29-2 to 29-4 illustrated in FIGS. 9 to 10, the protrusions 33, which are formed at joining by swaging, and the through-holes 34 may be layered alternately and accordingly the spaces 29a may be formed between the protrusions 33. Even in this case, in the first swaging portions 28, the protrusions 33 and the through-holes 34 are layered alternately and thus it is possible co appropriately ensure mechanical strength in the state in which the metal plates 27 are connected.

Effect of First Swaging Portions and Second Swaging Portions

As illustrated in FIGS. 2 and FIG. 6, the stator core 23 configured as described above is welded with the container 2 by spot welding in positons corresponding to the second swaging portions 29, respectively, and accordingly the welding portions 20 are formed. In other words, the second swaging portions 29 are arranged in the vicinity of the welding portions 20 of the stator core 23. The spaces 29a functioning as the heat insulation space in the second swaging portion 29, are formed between the first metal plates 27A with the protrusions 33 as illustrated in FIG. 8. For this reason, in the stator core 23, transmission of heat from the welding portion 20 into the stator core 23 because of thermal conduction is suppressed by the spaces 29a. Accordingly, in the stator core 23, because the spaces 29a functioning as the heat insulation space are formed in each of the second swaging portions 29, transmission of heat from the welding portion 20 into the stator core 23, is significantly suppressed by the spaces 29a when the outer circumferential surface of the stator core 23 is welded with the container 2. This makes it possible to prevent the stator core 23 from deforming due to heat at welding. Additionally, the insulating film 26, which is attached to the stator core 23, is suppressed from deforming or melting due to heat transmitted from the welding portions 20.

In the embodiment, furthermore, because both sides of the space 29a in the axial direction are sealed by the first metal plates 27A, fluid serving as a medium that transmits heat (such as air, refrigerant, or refrigerant oil) is prevented from flowing into or out of the spaces 29a. This also makes it possible to prevent thermal transmission due to convection flow of fluid with which the spaces 29a are filled, and thermal transmission from the welding portions 20 to the stator core 23 is further suppressed. In the stator core 23, fluid (such as air, refrigerant, or refrigerant oil) may flow into the spaces 29a. In this case, while heat is transmitted easily through the spaces 29a by convection flow, heat is suppressed from being transmitted from the welding portions 20 to the stator core 23 compared to the case without the spaces 29a (the case where heat is transmitted directly by the metal plates 27).

In the stator core 23, the protrusions 33 of the metal plates 27 are joined by swaging in the first swaging portions 28, and thus the mechanical strength of the stator core 23 is ensured. Furthermore, also in the second swaging portions 29 in which the spaces 29a are formed, part of the protrusion 33 (the bottom of the protrusion 33) and part of the through hole 34 (the opening edge of the through hole 34) are joined by swaging, and accordingly mechanical strength of the stator core 23 is ensured. For this reason, when heat is transmitted from the welding portions 20 to the second swaging portions 29 in which the spaces 29a are formed, deformation around the spaces 29a of the stator core 23 is suppressed. This suppresses the stator core 23 from expanding, contracting, and deforming due to heat that is transmitted from the welding portions 20 when the stator core 23 and the container 2 are welded together. Accordingly, because of the second swaging portions 29, the stator core 23 enables both suppression of the insulating film 26 from deforming and melting because heat is transmitted from the welding portions 20 to the stator core 23 and suppression of the stator core 23 itself from deforming due to heat from the welding portions 20.

Effect of First Embodiment

The compressor 1 of the first embodiment includes the container 2, in which the intake pipe 11 and the ejection pipe 12 are arranged; the compression unit 5 that is arranged in the container 2 and that compresses a refrigerant which is taken in from the intake pipe 11; and the three-phase motor 6 that is arranged in the container 2 and that drives the compression unit 5. The three-phase motor 6 includes the rotor 21 that is arranged coaxially with the shaft 3 serving as a rotation shaft of the compression unit 5, and the stator 22 that is arranged on an outer circumferential side of the rotor 21. On an outer circumferential surface of the stator core 23 of the stator 22, the welding portions 20, in which the stator 22 and the container 2 are welded together, are formed. The three-phase motor 6 includes the stator core 23 which is annular and in which the metal plates 27 are layered. The stator core 23 of the three-phase motor 6 includes the swaging portions (the first swaging portion 28 and the second swaging portion 29), in which the metal plates 27 are joined by swaging and the spaces 29a that function as a heat insulation space that blocks heat, which is transmitted from the welding portion 20, are formed in the second swaging portion 29 that is arranged in a position corresponding to the welding portion 20 in a circumferential direction of the stator core 23 among the swaging portions. In the embodiment, in the second swaging portion 29 in which the spaces 29a are formed, the protrusion 33 of the first metal plate 27A, which has the protrusion 33, enters the through-hole 34 of the second metal plate 27B, which has the through-hole 34, and thus the space 29a is formed between the (at least two) protrusions 33. Accordingly, the space 29a functioning as the heat insulation space that blocks heat transmitted from the welding portion 20 when the stator 22 and the container 2 are welded together via the welding portion 20, is formed in the second swaging portion 29 that is arranged in the position corresponding to the welding portion 20. The space 29a of the second swaging portion 29 of the stator core 23 thus suppresses heat from the welding portion 20 from being transmitted to the stator core 23. It is also possible to suppress the stator core 23 from deforming due to heat that is transmitted from the welding portion 20 when the stator 22 and the container 2 are welded together.

In the stator core 23 of the three-phase motor 6 in the compressor 1 of the first embodiment, the first metal plates 27A, which has the protrusions 33, and the second metal plates 27B, which has the through-holes 34, are layered alternately in the second swaging portion 29. Layering the first metal plates 27A and the second metal plates 27B alternately in the second swaging portion 29 as described above, makes it possible to form spaces in which swaging portions are housed between the first metal plates 27A having the protrusions 33, increase adherence between the metal plates 27 that are adjacent (the first metal plates 27A and the second metal plates 27B) in the direction of layering, and increase dimensional accuracy of the stator core 23, and form the spaces 29a equally in the direction in which the metal plates 27 are layered.

In the stator core 23 of the three-phase motor 6 of the compressor 1 of the embodiment, the protrusion 33 that is formed in the first metal plate 27A, and the through-hole 34 that is formed in the second metal plate 27B, are joined by swaging in the second swaging portion 29 in which the spaces 29a functioning as the heat insulation space are formed. As described above, in the second swaging portion 29 including the spaces 29a, for example, joining by swaging the bottom of the protrusion 33 and the opening edge of the through-hole 34 makes it possible to reinforce rigidity around the space 29a that lowers because of exposure of the metal plates that only overlap and are not joined around the spaces 29a because the spaces 29a are formed in the stator core 23 and increase mechanical strength of the stator 22. Accordingly, it is possible to further suppress the stator core 23 from deforming due to heat that is transmitted from the welding portions 20 when the stator 22 and the container 2 are welded together.

In the stator core 23 of the three-phase motor 6 in the compressor 1 of the embodiment, in the case where the insulating film 26, which insulates the stator core teeth 32 and the winding wires 46, is arranged in the stator core 23, it is possible to suppress the insulating film 26 from deforming or melting due to heat that is transmitted from the welding portions 20 when the stator 22 and the container 2 are welded together, and increase reliability of the insulating state of the winding wires 46.

In the stator core 23 of the three-phase motor 6 in the compressor 1 of the embodiment, the first swaging portions 28 are arranged at intervals in the circumferential direction of the stator core 23.

Furthermore, the second swaging portions 29 are arranged between the first swaging portions 28. Accordingly, the metal plates 27 are joined tightly because of the first swaging portions 28 and the second swaging portions 29 that are arranged regularly in the circumferential direction of the stator core 23, and it is possible to appropriately ensure mechanical strength of the stator core 23.

In the stator core 23 of the three-phase motor 6 in the compressor 1 of the embodiment, the metal plates 27 the second metal plates 27B) that have the through hole 34, into which the protrusion 33, arranged in the first swaging portion 28, enters, and the through-hole 34, into which the protrusion 33, arranged in the second swaging portion 29, enters, respectively, are arranged in one end in the direction in which the metal plates 27 are layered. This makes it possible to prevent the tip of the protrusion 33 in the first swaging portion 28 and the tip of the protrusion 33 in the second swaging portion 29 from protruding from the end face of the stator core 23 to the outside of the stator core 23, and thus prevent the stator core 23 from being damaged. Furthermore, the top and bottom of the stator core 23 is checked easily in the process of manufacturing the compressor 1, which makes it easy to handle the stator core 23 in examination.

Other embodiments will be described with reference to the drawings. In other embodiments, the same configuration as that of the first embodiment is denoted with the same reference numerals as those of the first embodiment, and description thereof will be omitted. In other embodiments, the configuration of the second swaging portion is different from that of the second swaging portion 29 in the first embodiment. Specifically, the second swaging portions in the second to fourth embodiments are different from that of the first embodiment in the order in which the first metal plates 27A and the second metal plates 27B, which form the stator core 23, are layered.

Second Embodiment

FIG. 9 is a longitudinal cross-sectional view illustrating a second swaging portion of the stator core 23 in a second embodiment in an enlarged manner, and is a cross-sectional view taken along the line D-D in FIG. 6. As illustrated in FIG. 9, in the second swaging portion 29-2 that the stator core 23 in the second embodiment includes, the first metal plates 27A and the second metal plates 27B are layered in an order in which two first metal plates 27A are layered successively and one second metal plate 27B is layered between the first metal plates 27A. In other words, the second swaging portion 29-2 has layering in an order in which one second metal plate 27B is arranged each time two first metal plates 27A are arranged successively. Furthermore, as in the first embodiment, in the second swaging portion 29-2 that is arranged in a position corresponding to the welding portion 20 in the circumferential direction of the stator core 23, the spaces 29a functioning as a heat insulation space which blocks heat transmitted from the welding portion 20, is formed. In other words, in the second swaging portion 29-2, the protrusion 33 of the first metal plate 27A enters the through-hole 34 of the second metal plate 27B, so that the space 29a is formed between the protrusions 33.

In the second swaging portion 29-2, because the protrusions 33 of two first metal plates 27A, which are adjacent to each other, are joined by swaging, mechanical strength in the state of connection between the metal plates 27 is increased. Also in the second embodiment, in the first swaging portion 28, the protrusions 33 of the first metal plate 27A and the second metal plate 27B are joined by swaging and, in the second swaging portion 29-2, because the protrusions 33 are joined by swaging, and the bottom of the protrusion 33 and the opening edge of the through-hole 34 are joined by swaging, it is possible to make up for mechanical strength in the state of connection between the metal plates 27 by the first swaging portion 28.

Effect of Second Embodiment

According to the second embodiment, in the second swaging portion 29-2, it is possible to loin by swaging the protrusions 33 of the two adjacent first metal plates 27A, and by swaging the protrusion 33 of the first metal plate 27A and the opening edge of the through-hole 34 of the second metal plate 27B that are adjacent to each other, and it is possible to make up for mechanical strength in the state of connection between the metal plates 27 by the first swaging portion 28. Also in the second embodiment, as in the first embodiment, the second swaging portion 29-2, in which the spaces 29a functioning as a heat insulation space that blocks heat transmitted from the welding portion 20 are formed, suppresses heat from the welding portion 20 from being transmitted to the stator core 23 when the stator 22 and the container 2 are welded together via the welding portion 20.

Third Embodiment

FIG. 10 is a longitudinal cross-sectional view illustrating a second swaging portion of the stator core 23 in a third embodiment in an enlarged manner, and is a cross-sectional view taking along the line D-D in FIG. 6. As illustrated in FIG. 10, in a second swaging portion 29-3 that the stator core 23 in the third embodiment includes, the first metal plates 27A and the second metal plates 27B are layered in an order in which two second metal plates 27B are layered successively between two first metal plates 27A. In other words, the second swaging portion 29-3 has layering in an order in which one first metal plate 27A is arranged each time two second metal plates 27B are arranged successively. Furthermore, as in the first embodiment and the second embodiment, in the second swaging portion 29-3 that is arranged in a position corresponding to the welding portion 20 in the circumferential direction of the stator core 23, the spaces 29a, functioning as a heat insulation space that blocks heat transmitted from the welding portion 20, are formed. In other words, in the second swaging portion 29-3, the protrusion 33 of the first metal plate 27A enters the through-hole 34 of the second metal plate 27B, so that the space 29a is formed between the protrusions 33. In the second swaging portion 293, it is possible to form one space 29a largely by the through-hole 34 of the second metal plates 27B adjacent to each other in the direction in which the metal plates 27 are layered.

Effect of Third Embodiment

Accord in to the third embodiment, in the second swaging portion 29-3, as in the first and second embodiments, it is possible to loin by swaging the protrusion 33 of the first metal plate 27A and the opening edge of the through-hole 34 of the second metal late 27B that are adjacent to each other, and it is possible to make up for mechanical strength in the state of connection between the metal plates 27 by the first swaging portion 28. Also in the third embodiment, as in the first and second embodiments, the second swaging portion 29-3, in which the spaces 29a functioning as a heat insulation space that blocks heat transmitted from the welding portion 20 are formed, suppresses the stator core 23 from deforming due to heat that is transmitted from the welding portion 20 when the stator 22 and the container 2 are welded together. Furthermore, it is possible to ensure one space 29a largely by each through-hole 34 of two second metal plates 27B that are adjacent to each other, and it is possible to increase heat insulation efficiency by one space 29a.

Fourth Embodiment

Figure 11:
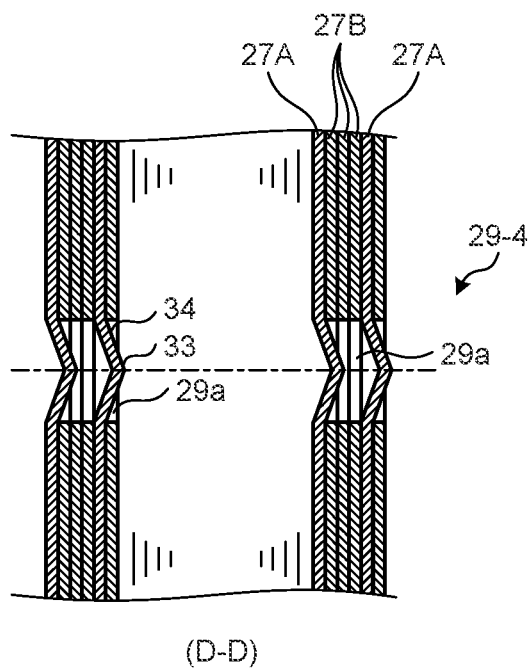
FIG. 11 is a longitudinal cross-sectional view illustrating a second swaging portion and a heat insulation space of a stator core in a fourth embodiment in an enlarged manner.

FIG. 11 is a longitudinal cross-sectional view illustrating a second swaging portion of the stator core 23 in a fourth embodiment in an enlarged manner, and is a cross-sectional view taken along the line D-D in FIG. 6. As illustrated in FIG. 11, in a second swaging portion 29-4 that the stator core 23 in the fourth embodiment includes, the first metal plates 27A and the second metal plates 27B are layered in an order in which three second metal plates 27B are layered successively between two first metal plates 27A. In other words, the second swaging portion 29-4 has layering in an order in which one first metal plate 27A is arranged each time three second metal plates 27B are arranged successively. Furthermore, as in the first to third embodiments, in the second swaging portion 29-4 that is arranged in a position corresponding to the welding portion 20 in the circumferential direction of the stator core 23, the spaces 29a functioning as a heat insulation space that blocks heat transmitted from the welding portion 20 are formed. In other words, in the second swaging portion 29-4, the protrusion 33 of the first metal plate 27A enters the through-hole 34 of the second metal plate 27B, so that the space 29a is formed between the protrusions 33. In the second swaging portion 29-4, compared to the embodiment 3, it is possible to form one space 29a more largely by the through hole 34 of the second metal plates 27B adjacent to each other in the direction in which the metal plates 27 are layered.

Effect of Fourth Embodiment

According to the fourth embodiment, in the second swaging portion 29-4, as in the first to third embodiments, it is possible to join by swaging the protrusion 33 of the first metal plate 27A and the opening edge of the through-hole 34 of the second metal plate 27E that are adjacent to each other, and it is possible to make up for mechanical strength in the state of connection between the metal plates 27 by the first swaging portion 28. Also in the fourth embodiment, as in the first to third embodiments, the second swaging portion 29-4, in which the space 29a functioning as a heat insulation space that blocks heat transmitted from the welding portion 20 are formed, suppresses the stator core 23 from deforming due to heat that is transmitted from the welding portion 20 when the stator 22 and the container 2 are welded together. Furthermore, in the second swaging portion 29-4, it is possible to ensure one space 29a more largely by each through-hole 34 of three second metal plates 27B that are successive in the direction in which the metal plates 27 are layered, and it is possible to increase insulation efficiency by one space 29a.

The compressor disclosed herein is not limited to a rotary compressor including a piston and a vane, and the compressor may be applicable to another compressor, such as a scroll compressor.

REFERENCE SIGNS LIST

1 COMPRESSOR
2 CONTAINER (COMPRESSOR HOUSING)
3 SHAFT (ROTATION SHAFT)
5 COMPRESSION UNIT
6 THREE-PHASE MOTOR
21 ROTOR
22 STATOR
23 STATOR CORE
26 INSULATING FILM (INSULATING MEMBER)
27 METAL PLATE
27A FIRST METAL PLATE
27B SECOND METAL PLATE
28 FIRST SWAGING PORTION
29 SECOND SWAGING PORTION
29a SPACE (HEAT INSULATION SPACE)
32 (32-1 TO 32-9) STATOR CORE TEETH (WINDING DRUM PORTION)
33 PROTRUSION
34 THROUGH-HOLE
46 WINDING

The invention claimed is:

1. A compressor comprising: a compressor housing, in which an intake unit and an ejection unit for a refrigerant are arranged; a compression unit that is arranged in the compressor housing, and that is configured to compress refrigerant which is taken in from the intake unit; and a motor that is arranged in the compressor housing, and that is configured to drive the compression unit, the motor including a rotor that is arranged coaxially with a rotation shaft of the compression unit, and a stator that is arranged on an outer circumferential side of the rotor, and the stator having an outer circumferential surface on which a plurality of welding portions, in which the stator and the compressor housing are welded together, are formed, wherein the stator includes a stator core which is annular and in which a plurality of metal plates are layered, the stator core includes a plurality of swaging portions, in which the metal plates are joined by swaging, the plurality of metal plates includes a plurality of first metal plates each having a protrusion and a plurality of second metal plates each having a through-hole, each protrusion entering into a corresponding through-hole and joining the plurality of metal plates in corresponding swaging portions of the plurality of swaging portions, thereby forming corresponding heat insulation spaces between respective protrusions in a direction in which the plurality of metal plates are layered, the heat insulating spaces block heat which is transmitted from corresponding welding portions of the plurality of welding portions, and the heat insulation spaces are arranged in alignment with the corresponding welding portions in a circumferential direction of the stator core, and the protrusions are joined in the corresponding swaging portions such that a proximal end of an inclined surface of each protrusion is in contact with an opening edge of the corresponding through hole.

2. The compressor according to claim 1, wherein at least one protrusion of the respective protrusions forming the heat insulation spaces is joined to another protrusion of the respective protrusions by swaging.

3. The compressor according to claim 1, wherein the stator core has a winding drum portion around which a winding is wound, and an insulating member, which insulates the winding drum portion and the winding, is arranged in the stator core.

* * * * *